2,983,873
PULSE TIME DISCRIMINATOR CIRCUIT WHICH ELIMINATES TRANSIENTS INDUCED BY GATING PULSES

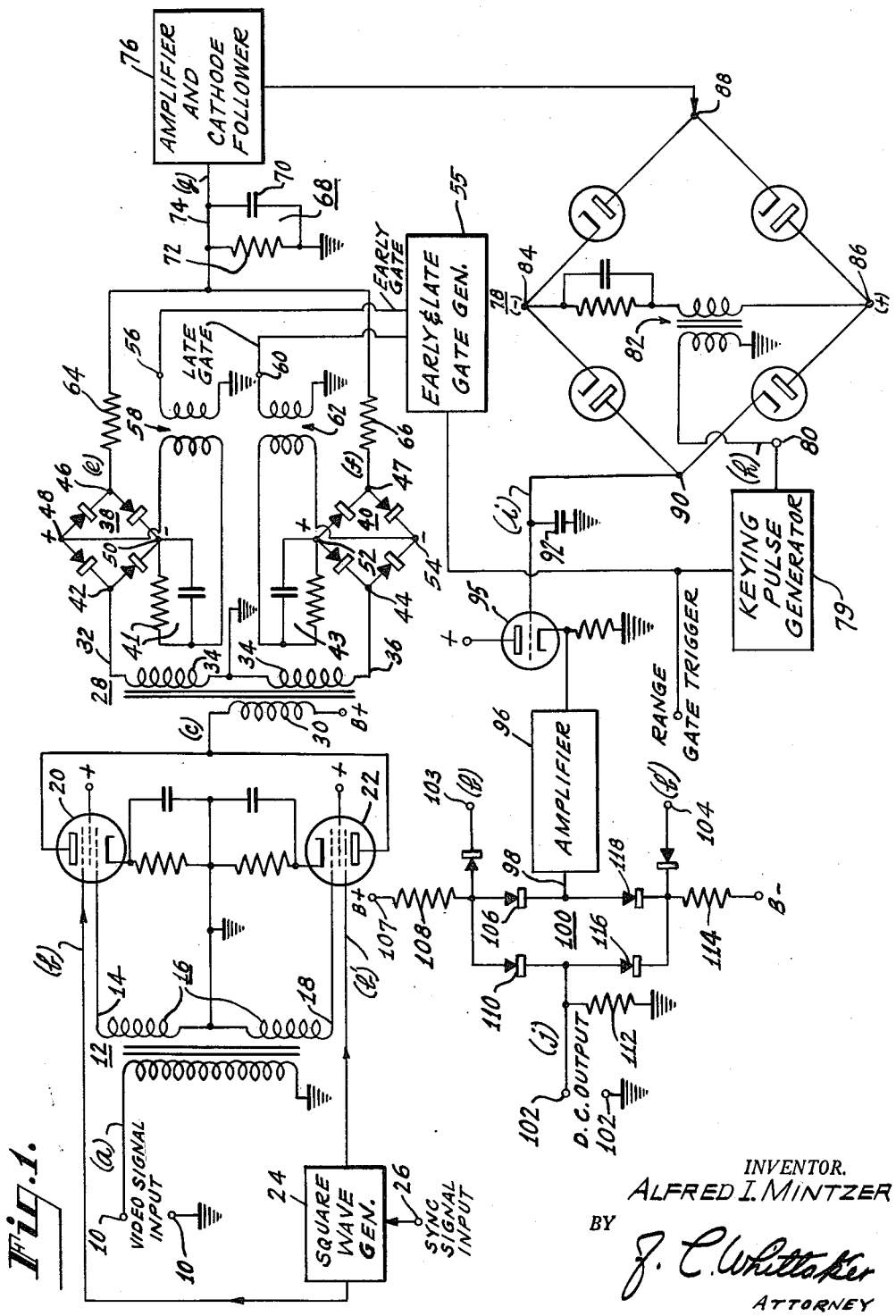

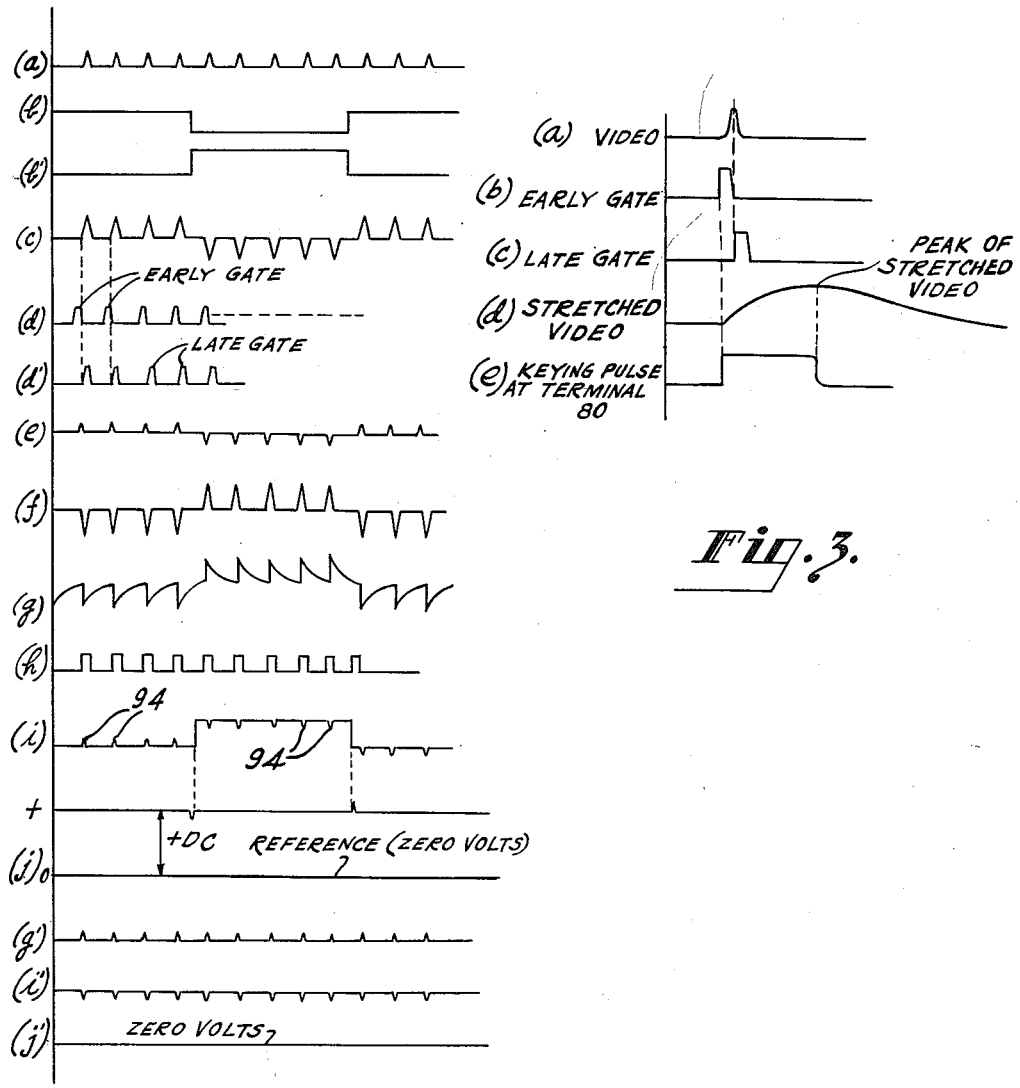

Alfred I. Mintzer, Collingswood, N.J., assignor to Radio Corporation of America, a corporation of Delaware Filed Jan. 30, 1957, Ser. No. 637,106

8 Claims. (Cl. 328—109)

The present invention relates to an improved circuit for sensing the time of occurence of a pulse signal. The invention is particularly useful in high precision automatic tracking radar systems.

An automatic tracking radar system is one which, after locking on a target, continues to supply information as to the position of the target. The automatic tracking circuits of the radar system compare the time of occurence of a target echo with the time of occurrence of one or more gate pulses generated in the radar system. Any change in time relationship is sensed and converted to an error voltage. The error voltage maintains the time relationship between the gate pulse or pulses and the echo constant by controlling the time of occurrence of the gate pulse or pulses.

The sensing described above is performed by a time (or phase) discriminator circuit. Several types of such circuits are commonly in use. The split gate circuit is a typical example. Here, early and late gate pulses of the same polarity are generated. The gate pulses are separately amplified and they individually control switches through which the video pulses derived from the target echo pulses pass. The video pulses which pass through the switches are usually "stretched" or integrated and then combined, and the combined integrated pulses are used to produce a direct error or control voltage. The error voltage is indicative of the difference in phase or time between the crossover point of the early and late gate pulses and the video pulses.

A basic problem which is common to the split gate time discriminator circuit, and to other discriminator circuits in which gating techniques are employed to provide sensing information, is that the gate pulses themselves introduce errors. This is due to the imperfections in the switches. In other words, the gate pulses, which have steep leading and lagging edges, create transients which pass through the switches along with the video pulses and which appear in attenuated form at the output circuit of the switches. These transients are commonly known as "residue" or "pedestal" voltages. The residue voltages are highly undesirable. They pass through the pulse stretching and integrating circuits and produce errors in the output error voltage.

Residue voltages may arise from parasitic transmission elements as, for example, stray reactances, or from leakage, or from the remote cut-off characteristics of multi-grid or triode vacuum tubes. In the latter case, there is always some residual current to prevent total switching action. These effects are difficult to predict or control, and feedback cancelling schemes produce only partial compensation.

In typical demodulator or discriminator systems, the output voltages of two switched circuits are compared in phase opposition. This produces the required sensing and provides a first order balancing, that is, cancellation of the residue voltages. However, in practice it is extremely difficult to obtain perfect matching and, moreover, after adjustments have been made, they are difficult to maintain for any length of time. There are simply too many uncontrolled variables which produce the residue voltage. As soon as the adjustment drifts, as it inevitably does, the remaining residue voltage (the portion no longer cancelled) then produces an uncontrollable bias off-set error in the output error voltage of the system.

Another commonly employed technique to remove the residue voltage is by means of clipper circuits. A disadvantage of clipping is that the dynamic operating range of the discriminator is substantially lowered. In other words, the ability of the time discriminator to sense low amplitude video pulses is seriously impaired. Another disadvantage is that the clipping stages themselves introduce distortions which affect the accuracy of the error voltage.

An object of this invention is to provide an improved circuit for eliminating the effects of residue voltages in the error voltage output of gated discriminator circuits.

Another object of this invention is to provide an improved, extremely high precision time discriminator circuit.

According to this invention, the input unidirectional video pulses, the times of occurrence of which are to be sensed, are converted to positive and negative-going pulses. The commutation frequency, that is, the pulse reversal frequency, is a fraction of the pulse recurrence frequency. The positive and negative-going video pulses are passed through bidirectional switches which are controlled by early and late gates. The output pulses of the switches are combined and integrated and the alternating current envelope of the pulses detected and amplified. This envelope has a phase indicative of the time of occurrence of the video pulses relative to the gate pulses and an amplitude indicative of the time displacement between the crossover point of the gate pulses and the video pulses. Any residue voltage which passes through the time discriminator is at the gate pulse frequency—a frequency much higher than the envelope frequency, and can readily be removed by filtering.

The invention will be described in greater detail by reference to the following description taken in connection with the accompanying drawing in which:

Figure 1 is a schematic circuit diagram of a typical embodiment of the present invention; and Figures 2 and 3 show waveforms which are helpful in explaining how the circuit of Figure 1 operates.

Referring to the drawing, input video signals $a$ are applied from the radar receiver (not shown) to input terminals 10. These signals are preferably gated, that is, only those signals within a restricted range interval of interest are applied to terminals 10. Transformer 12 is a pulse inverting transformer. Accordingly, the signals appearing at end 14 of secondary winding 16 are of one polarity, say positive-going, and the signals appearing at the other end 18 of secondary winding 16 are of opposite polarity, say negative-going. The signals at 14 and 18 are applied to the control grids of pentodes 20 and 22, respectively. The screen grids of the pentodes are connected to a positive voltage source (not shown). A square wave generator 24 applies square wave commutation gate pulses $b$ and $b'$ to the suppressor grids of the pentodes. As can be seen in Figure 2, the square waves are 180° out of phase. The waves have an amplitude sufficient to drive the pentodes below cut-off during the negative-going portion of each wave and above cut-off during the positive-going portion of each wave.

The frequency of the commutation wave is a fraction of that of the video pulses. In the embodiment of the invention chosen for illustration, each half cycle of the square wave is equivalent to five video pulses. In other words, the frequency of the square wave is one-tenth that of the pulses. The square wave frequency is coherent with that of the pulses. This coherence may be obtained by applying synchronizing pulses to input terminal 26, the synchronizing pulses being obtained, for example, from the timing circuits in the radar system. One way in which the pulses may be obtained is to count down the pulses used to synchronize the radar system transmitter. The phase of the square wave is such that its transitions (from one voltage level to another) do not occur during the gate periods. The square wave generator itself may comprise a bistable multivibrator or other similar circuit.

In the operation of the circuit as described so far, positive-going pulses are applied to the control grid of pentode 20 and negative-going pulses to the control grid of pentode 22. When pentode 20 is turned on by commutation pulse $b$, it produces negative-going output pulses; when pentode 22 is turned on by square wave $b'$, it produces positive-going output pulses. Both positive and negative-going output pulses are applied to a common load circuit, pulse transformer 28. The pulses applied to the primary winding of transformer 28 are shown in Figure 2c.

Transformer 28, like transformer 12, is a pulse inverting transformer. Thus, when positive-going pulses are applied to primary winding 30, positive-going pulses appear at the end 32 of secondary winding 34 and negative-going pulses appear at the end 36 of secondary winding 34. By the same token, when the pulses applied to winding 30 are negative-going, those at secondary winding end 32 are negative-going and those at winding end 36 are positive-going.

Bridge circuits 38 and 40 each comprise bidirectional diode switches. These circuits are ordinarily maintained cut-off by bias voltages developed in circuits 41 and 43, respectively, so that they normally do not permit signals applied to their input terminals 42 and 44, respectively, to pass to their output terminals 46 and 47, respectively. However, when a signal is applied to terminals 48 and 50 of bridge 38, or 52 and 54 of bridge 40 of the polarities indicated in the figure, the bridge circuits are placed in condition to conduct.

In operation, an early gate pulse is applied from generator 55 to input terminal 56 of transformer 58. A short time later, a late gate pulse is applied from generator 55 to input terminal 60 of transformer 62. The early gate pulse places diode circuit 38 in condition to pass an input pulse (either positive or negative-going); the late gate pulse does the same to diode circuit 40. The early and late gates are shown in Figures 2d and 2d'. Note that the gates and other pulses shown in Figure 2 are not drawn to scale. Note also that other types of discriminators may be used instead of the one shown.

As mentioned previously, the pulses applied to input terminal 42 are first of one polarity, then of the opposite polarity, etc. The same holds for the pulses applied to terminal 44. For the purpose of the explanation which follows, it will be assumed that these video pulses are underranged. In other words, the time position at the crossover point between early and late gates occurs before the center of the video pulses and therefore more of the video pulses pass through switch 40, which is turned on by the late gate, then through switch 38, which is turned on by the early gate. This is illustrated in Figures 2e and 2f.

Pulses $e$ and $f$ are applied through coupling resistors 64 and 66 to integrating circuit 68. The latter consists of a capacitor 70 of relatively large value which is charged by the output pulses from the time discriminator and a resistor 72 of relatively large value through which the condenser slowly discharges between pulses. The resultant integrated or stretched wave available at lead 74 is shown in Figure 2g.

The integrated wave $g$ is applied through an amplifier and a cathode follower stage 76 to a so-called "boxcar" circuit 78 to detect the envelope of said integrated wave. The boxcar circuit is a bidirectional switch. It is gated on by a pulse type signal (see Figure 2h) applied from keying pulse generator 79, to input terminals 80, to pulse transformer 82. The keying or gating signal consists of a rectangular wave having a leading edge coincident with the leading edge of the early gate and a lagging edge coincident with the peak of the pulse stretched input signal voltage. The keying pulse and related waveforms are shown to scale in Figure 3.

The keying pulse may be produced by a monostable multivibrator in block 79 which is triggered by a synchronization signal taken from the radar timing circuits. The pulse is of a polarity such that when applied to transformer 82, potentials of the polarity indicated are developed at bridge terminals 84 and 86, and the bridge circuit is capable of conducting either a positive or a negative-going signal applied at input terminal 88, to output terminal 90. The output signals of the boxcar circuit charge capacitor 92. Note that this capacitor has no discharge path in the absence of the keying pulse, whereby the voltage appearing across it is maintained substantially constant during the intervals between keying pulses. The polarity of the D.C. voltage appearing across the capacitor at terminal 90 changes when the polarity of the input signal applied to terminal 88 changes. This signal is illustrated in Figure 2i.

The keying pulse applied to terminals 80 and the range gate pulses applied to the time discriminator stage produce undesirable transients (residue voltages). These pass through the boxcar circuit 78 and appear as notches or blips 94 (see Figure 2i). As explained more fully below, in the present circuit, the deleterious effects of these residue pulses are nullified.

The voltage $i$ across condenser 92 is applied through cathode follower 95 to amplifier 96. The amplifier is a conventional type operating over a band-pass centered at the commutation frequency; that is, the frequency of the square wave output of generator 24. Ideally, a square wave output is desired at lead 98. However, if the band-pass of amplifier 96 were made sufficiently broad to pass a square wave, the higher frequency residue or interference pulses 94, Figure 2i) would also pass, and these could overload subsequent amplifier stages. On the other hand, if too much smoothing is applied (that is, if the band-pass of the amplifier is made sufficiently narrow) the commutated output of the box car circuit would approach a sine wave and considerable ripple would be present in the direct current output at terminals 102. In addition, matching the phase of the amplifier output signal to that of the commutation signal employed in the following stage 100 would be more critical. As a compromise therefore the band-pass of amplifier 96 is adjusted to provide a somewhat rounded square wave with adequate phase control with respect to the commutation signal.

The band-pass characteristics described above may be obtained by well known techniques. For example, selective feedback networks may be employed such as commonly used in operational amplifiers. The direct current components of course are not transmitted. Using negative voltage feedback also permits a desirable low impedance drive to the commutation demodulator stage 100 which is described below.

The signal output of amplifier 96 available at lead 98, is, as already mentioned, a slightly rounded off square wave and this signal is free of the residue voltage pulses 94. The phase of the signal at lead 98 is indicative of the direction of the error between the crossover point of the early and late gates and the video pulse. The amplitude of the signal is indicative of the extent of this error.

Stage 100 comprises a phase demodulator. The square wave output of generator 24 is applied to input terminals 103 and 104, wave b of one phase being applied to terminal 103 and wave b', which is 180° out of phase with wave b, being applied to terminal 104. If the square wave output of the amplifier 96 at lead 98 is in phase with the square wave applied to terminal 103, going positive when wave at 103 goes positive, diode 106 is back biased. In other words, the cathode of the diode is more positive than its anode and the diode therefore cannot conduct. The D.C. potential at the B+ terminal 107 then causes current flow through resistor 108, diode 110 and resistor 112. This current flow causes a positive direct voltage output at terminals 102. The amplitude of the direct voltage depends upon the amplitude of the square wave at 98. When the bias level on diode 106 is overcome, the diode conducts and the voltage at terminals 102 is limited to a given value. In other words, the voltage at terminal 98 clamps the output voltage at terminals 102 via conduction through diode 106 and resistor 108. In a similar manner, if the voltage at lead 98 is of opposite phase, that is, it is negative when square wave b' applied to terminal 104 is negative, a negative output voltage appears at terminal 102. This voltage is developed by current flow through resistor 114, diode 116 and resistor 112. Again, the voltage at lead 98 determines the value of the output voltage at terminals 102, as the former clamps the latter by means of conduction through resistor 114 and diode 118.

The circuit described above is, in effect, a half-wave phase demodulator. Full wave demodulation can readily be obtained if a signal 180° out of phase with that at terminal 98 is applied to an identical switch demodulator whose output is common to that of the first demodulator.

The output of the phase demodulator available at terminals 102 consist of a D.C. signal such as illustrated in Figure 2j. As can be seen, this wave has notches which correspond to the leading and lagging edges of the square wave of waveform i. These notches are of little importance as they are smoothed out in the subsequent servo equalization circuits (not shown) to which they are applied. This error voltage is used in the early and late gate generating circuits to change the phase position of the crossover point of the gates to make it correspond to the center of the video pulses. The wave shown at j indicates that the system is underranged. If it were overranged, the wave would be negative rather than positive. When the gates are on target, wave g becomes wave g', wave i becomes wave i', and wave j becomes wave j', as shown at the bottom of Figure 2.

What is claimed is:

1. In combination, connections for a source of unidirectional signal pulses; means coupled to said connections for inverting the polarity of successive groups of the pulses, where each group consists of n pulses, and n is an integer; time discriminator means connected to the last-named means for sensing the time of occurrence of each pulse and producing an output signal for each pulse having a sense and amplitude, relative to that pulse, indicative of the time relation between the pulse and a reference time; and means connected to receive the output signals of the time discriminator for detecting the envelope of the output signals at the frequency at which the pulses are inverted.

2. In combination, connections for a source of unidirectional signal pulses; means coupled to said connections for inverting the polarity of successive groups of the pulses, where each group consists of n pulses, and n is an integer; time discriminator means connected to the last-named means for sensing the time of occurrence of each pulse and producing an output signal for each pulse having a sense and amplitude, relative to that pulse, indicative of the time relation between the pulse and a reference time; means connected to receive the output signals of the time discriminator for detecting the envelope of the output signals at the frequency at which the pulses are inverted; and means connected to respond to the envelope for producing a direct voltage indicative of the time of occurrence of the signal pulses relative to the reference time.

3. In combination, connections for a source of unidirectional signal pulses; means coupled to said connections for inverting the polarity of successive groups of the pulses, where each group consists of n pulses, and n is an integer greater than 1; time discriminataor means connected to the last-named means for sensing the time of occurrence of each pulse and producing an output signal for each pulse having a sense and amplitude, relative to that pulse, indicative of the time relation between the pulse and a reference time; means connected to receive the output signals of the time discriminator for detecting the envelope of the output signals at the frequency at which the pulses are inverted; and means connected to respond to the envelope for producing a direct voltage indicative of the time of occurrence of the signal pulses relative to the reference time.

4. In combination, connections for a source of unidirectional signal pulses; means coupled to said connections for inverting the polarity of successive groups of the pulses, where each group consists of n pulses, and n is an integer greater than 1; time discriminator means connected to the last-named means for sensing the time of occurrence of each pulse and producing an output signal for each pulse having a sense and amplitude, relative to that pulse, indicative of time relation between the pulse and a reference time, said time discriminator means including a pair of normally closed bidirectional switches, means for applying the pulses in opposite polarity to the two switches, and means for opening one switch immediately prior to the reference time and closing it at the reference time, and for opening the other switch at the reference time and closing it immediately after the reference time; and means connected to receive the output signals of the time discriminator for detecting the envelope of the output signals at the frequency at which the pulses are inverted.

5. In a time discriminator circuit, connections for a source of unidirectional signal pulses; a pair of unidirectional switch means; means coupled to said connections for applying the signal pulses in one polarity to one of the switch means and in the opposite polarity to the other of the switch means; and means for alternately opening the two switch means at a frequency which is substantially lower than that of the pulse repetition frequency.

6. In combination, connections for a source of unidirectional signal pulses; means coupled to said connections for inverting the polarity of successive groups of the pulses, where each group consists of n pulses, and n is an integer; discriminator means connected to the last-named means for sensing the time of occurrence of each pulse and producing an output signal for each pulse having a sense and amplitude, relative to that pulse, indicative of a given relation between a pulse parameter and a reference parameter; and means connected to receive the output signals of said discriminator means for detecting the envelope of the output signals at the frequency at which the pulses are inverted.

7. In combination, connections for a source of unidirectional signal pulses; means coupled to said connections for inverting the polarity of successive groups of the pulses, where each group consists of n pulses, and n is an integer greater than 3; discriminator means connected to the last-named means for sensing the time of occurrence of each pulse and producing an output signal for each pulse having a sense and amplitude, relative to that pulse, indicative of the difference between a pulse parameter and a reference parameter; means connected to receive the output signals of the discriminator for detecting the envelope of the output signals at the frequency at which the pulses are inverted; and means connected to respond to the envelope for producing a direct voltage indicative of the relation between said pulse parameter and the reference parameter.

8. In combination, connections for a source of unidirectional signal pulses; means coupled to said connections for inverting the polarity of successive groups of the pulses, where each group consists of $n$ pulses, and $n$ is an integer; time discriminator means connected to the last-named means for sensing the time of occurrence of each pulse and producing an output signal for each pulse having a sense and amplitude, relative to that pulse, indicative of the time relation between the pulse and a reference time; means connected to receive the output signals of the time discriminator for detecting the envelope of the output signals at the frequency at which the pulses are inverted; means for filtering the resulting envelope signal to substantially reduce the amount of undesired transient voltages present in the envelope signal; and means comprising a phase demodulator to which said envelope signal is applied for producing a direct voltage indicative of the time of occurrence of the signal pulses relative to the reference time.

References Cited in the file of this patent

UNITED STATES PATENTS

| | | |
|---|---|---|
| 2,429,788 | Atwood | Oct. 28, 1947 |
| 2,566,331 | Huber et al. | Sept. 4, 1951 |
| 2,576,137 | Newitt | Nov. 27, 1951 |
| 2,577,668 | Wilmotte | Dec. 4, 1951 |
| 2,698,382 | Uglow et al. | Dec. 28, 1954 |
| 2,781,445 | Stocker | Feb. 12, 1957 |

OTHER REFERENCES

Ludwig and Hind: "Electronic Switch Eliminates Transients," Electronics, October 1955, pp. 163–65.